United States Patent
Phillips

[11] Patent Number: 6,058,293
[45] Date of Patent: May 2, 2000

[54] FRAME STRUCTURE FOR CELLULAR TELEPHONES

[75] Inventor: John C. Phillips, Raleigh, N.C.

[73] Assignee: Ericsson, Inc., Research Triangle Park, N.C.

[21] Appl. No.: 08/928,195

[22] Filed: Sep. 12, 1997

[51] Int. Cl.[7] .................................................. H04M 11/00
[52] U.S. Cl. .......................... 455/90; 455/550; 379/433
[58] Field of Search ............................. 455/90, 550, 575, 455/95, 100, 128, FOR 347, FOR 349, FOR 351, 348, 300, 301, 361, 349; 379/433, 434; 361/681, 682, 814, 829, 737, 752, 757, 818; D14/137, 138; 174/35 R, 35 GC; 235/492

[56] References Cited

U.S. PATENT DOCUMENTS

| | | | |
|---|---|---|---|
| 4,912,602 | 3/1990 | Zurek et al. | 455/90 |
| 5,175,873 | 12/1992 | Goldenberg et al. | 455/90 |
| 5,335,274 | 8/1994 | Masuda et al. | 379/433 |
| 5,710,987 | 1/1998 | Paulick | 455/90 |
| 5,711,013 | 1/1998 | Collett et al. | 455/575 |
| 5,722,055 | 2/1998 | Kobayashi et al. | 455/90 |

FOREIGN PATENT DOCUMENTS

| | | |
|---|---|---|
| 0 420 504 A2 | 4/1991 | European Pat. Off. . |
| 0 547 731 A1 | 6/1993 | European Pat. Off. . |
| 0 740 426 A2 | 10/1996 | European Pat. Off. . |

*Primary Examiner*—Reinhard J. Eisenzopf
*Assistant Examiner*—Greta J. Fuller
*Attorney, Agent, or Firm*—Coats & Bennett, P.L.L.C.

[57] ABSTRACT

A cellular telephone incorporating a structural frame member having a side wall and a web, where each of these structural elements are made up of different materials. Through selection of side wall and web materials, an overall frame structure having a significantly reduced web thickness, as compared to conventional cellular telephones, can be obtained. This reduction in web thickness ultimately translates to a reduction in overall phone unit thickness, thus allowing for the production of a smaller, more compact cellular telephone.

17 Claims, 3 Drawing Sheets

FRAME STRUCTURE FOR CELLULAR TELEPHONES

FIELD OF THE INVENTION

The present invention relates to cellular telephones and more particularly to frame designs for cellular telephones.

BACKGROUND OF THE INVENTION

Within the current domestic cellular telephone industry, there exists substantial economic and consumer pressure to reduce the physical size of hand held, cellular telephone units. Consequently, cellular telephone manufacturers tout the small size and light weight of their products, and are constantly striving to improve upon the material and mechanical efficiency of their designs.

Domestic manufacturers have capitalized on and taken advantage of a number of design aspects which have led to the relatively rapid appearance of smaller and thinner cellular phone units. However, in many cases, these designs have begun to reach the point where structural members such as the frame and plastic case enclosures are significant components of the overall thickness of the phone unit. For this reason, another strategy for implementing size and weight reduction involves minimization of the structural components. Unfortunately, in practice, it is difficult to remove thickness from the structural members of the phone without adversely affecting strength and reliability of the unit.

In the past, the problem of structural minimization has been approached by gradually reducing wall thickness in the plastic and metal structural components. However, current phone designs are already reaching the limits of existing thin wall technology. For example, the next generation phone designs currently under consideration will require a structural frame thickness on the order of 1.0 millimeter and a plastic component wall thickness of roughly 0.8 millimeters. Any further reduction in overall phone thickness would require local reductions in wall thickness to allow tall components such as IF filters to recess into a pocket formed in the frame or plastic case enclosure. Those skilled in the art will appreciate that magnesium and magnesium alloys are some of the most common materials used in structural frame members associated with cellular telephone units. In frames fabricated utilizing die-cast production techniques, wall thickness reduction is typically accomplished by switching from magnesium alloys to zinc or zinc alloys. However, there is a substantial weight penalty associated with zinc and its alloys which generally makes their use unattractive.

In general, thin wall components are very difficult to mold without cosmetic blemishes and tend to lack structural integrity due to the difficulties associated with maintaining the melt at sufficiently high temperatures as the part is molded or cast. Adding pockets of locally reduced wall thickness only serves to compound an already difficult problem. Furthermore, the inclusion of such pockets rigidly and absolutely fixes the location of the components which must be recessed within them, thus making future circuit board changes very costly to implement. Having local pockets also generally complicates any attempts to utilize the component across multiple systems or designs. That is, a pocketed, plastic enclosure case designed to accommodate tall components for a particular cellular phone model will probably not be easily utilized on a different phone model.

Therefore, there is and continues to be a need for a practical approach to further minimizing the size and weight of cellular telephone structural components beyond the limitations imposed by the thin wall fabrication techniques currently employed in the cellular telephone industry.

SUMMARY OF THE INVENTION

The present invention entails a cellular telephone design which incorporates a structural frame member which is thinner and lighter weight than comparable frames fabricated using conventional cellular telephone manufacturing techniques. Inclusion of a thinner, lighter weight structural frame member in a cellular telephone can significantly reduce both the thickness and the weight of the cellular telephone unit, and in the process can result in a smaller, more compact cellular phone.

Whereas conventional cellular telephone designs typically utilize a single material for the entire frame structure, the cellular telephone of the present invention achieves the reduction in size and weight through the use of a hybrid design, which utilizes different materials for different structural elements of the frame member. This strategy is successful, in part, because the materials used for construction of the frame structures in conventional cellular telephones are inherently limiting with regard to the minimum thickness' obtainable through traditional fabrication processes. The cellular telephone design of the present invention overcomes this problem by utilizing a unique approach to the problem of materials selection in conjunction with a modified fabrication process. In general, the hybrid frame design of the present invention simultaneously optimizes the mechanical strength to weight and size to weight ratios of the structural frame member by fabricating the relatively thick frame side wall of a light weight, die-castable material having an acceptable degree of mechanical strength. The frame web which extends between the side walls comprises a thin, high strength formed member which is composed of a different material.

In one particular embodiment, the cellular telephone of the present invention incorporates a hybrid structural frame member which utilizes a magnesium side wall and a steel web. Magnesium and magnesium alloys are materials commonly used in the construction of conventional cellular telephone structural frames for their superior strength to weight ratio and die-castability. The web, being comprised of a thin steel plate, is incorporated into the frame structure through a modified die-cast fabrication process, which includes an insert molding step. The result is a structural frame member, comparable in weight to conventionally fabricated frame members, which realizes a substantial reduction in web thickness. This reduction in web thickness ultimately translates into a cellular phone unit having a significant reduction in thickness.

It is therefore an object of the present invention to provide a light weight and sturdy frame structure for a cellular telephone unit that is cost effective and practical from a manufacturing perspective and which facilitates a reduction in the overall thickness of the cellular phone unit.

Other objects and advantages of the present invention will become apparent and obvious from a study of the following description and the accompanying drawings which are merely illustrative of such invention.

DESCRIPTION OF THE INVENTION

Figure 1:
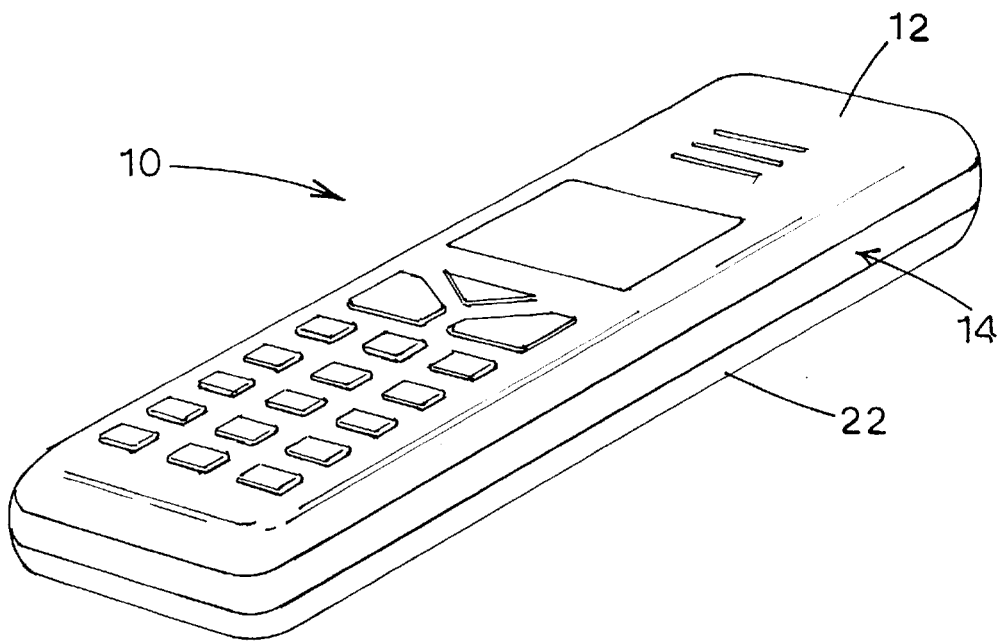
FIG. 1 is a perspective view of a typical prior art cellular telephone.
Figure 2:
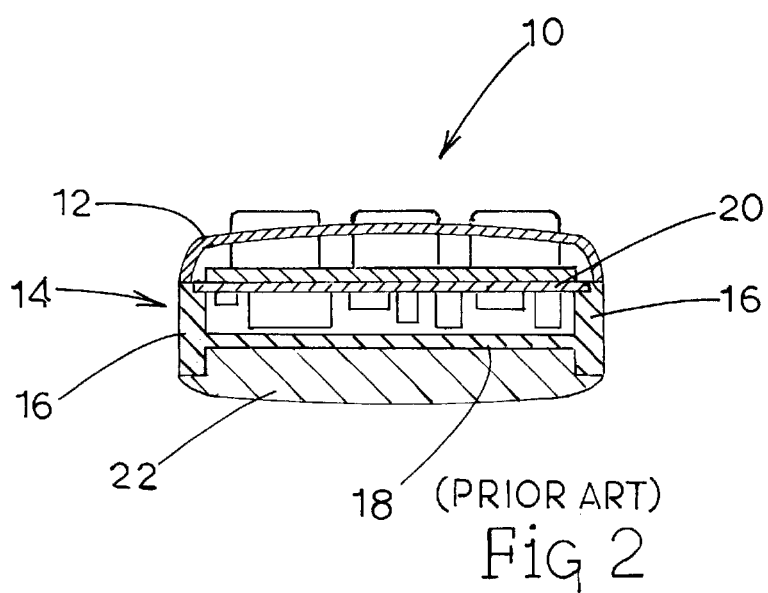
FIG. 2 is a schematic sectional view of the prior art cellular telephone having a die-cast frame.

Shown in FIGS. 1 and 2 is a typical, conventional hand held cellular telephone, indicated generally by the numeral 10, which is generally representative of a prior art cellular telephone design. The conventional cellular telephone 10 comprises an upper housing 12. Secured to the housing 12 is a main structural frame member 14 which is fabricated of a die-castable material using an associated die-casting process. The frame member 14 is comprised of a surrounding side wall 16 and a web 18. Web 18 extends between the side wall 16 and forms a printed circuit board compartment between the housing 12 and web 18. The printed circuit board compartment is bounded on the top by the housing 12, and on the bottom by the web 18. Contained within the printed circuit board compartment is a printed circuit board 20 and associated electrical components. The web 18 also serves to support or house a battery pack 22 which in the case of the prior art design of FIG. 2 forms the back of the cellular telephone 10.

As can be clearly seen in FIG. 2, the thickness of the web 18 is an important factor in determining the size of the printed circuit board compartment and ultimately the thickness of the cellular telephone 10. In general, reducing the thickness of the web 18 tends to increase the size of the printed circuit board compartment. In practice, any gains in compartment size resulting from a reduction in web thickness can be capitalized upon by reducing the overall thickness of the cellular phone.

However, in the case of prior art cellular telephone designs such as the phone unit 10 illustrated in FIGS. 1 and 2, conventional frame member materials and fabrication methods significantly limit the degree to which the thickness of the web 18 can be minimized. In particular, the prior art cellular phone 10 employs a unitized frame member 14 which is composed of a single die-castable material, typically magnesium or zinc, where the side wall 16 and the web 18 are necessarily constructed of the same material via a die-cast fabrication technique. As a consequence of the web thickness limitations imposed by the combination of conventional materials and fabrication techniques, these prior art cellular phone designs are also limited with respect to the minimum obtainable thickness of the overall phone unit 10.

Figure 3:
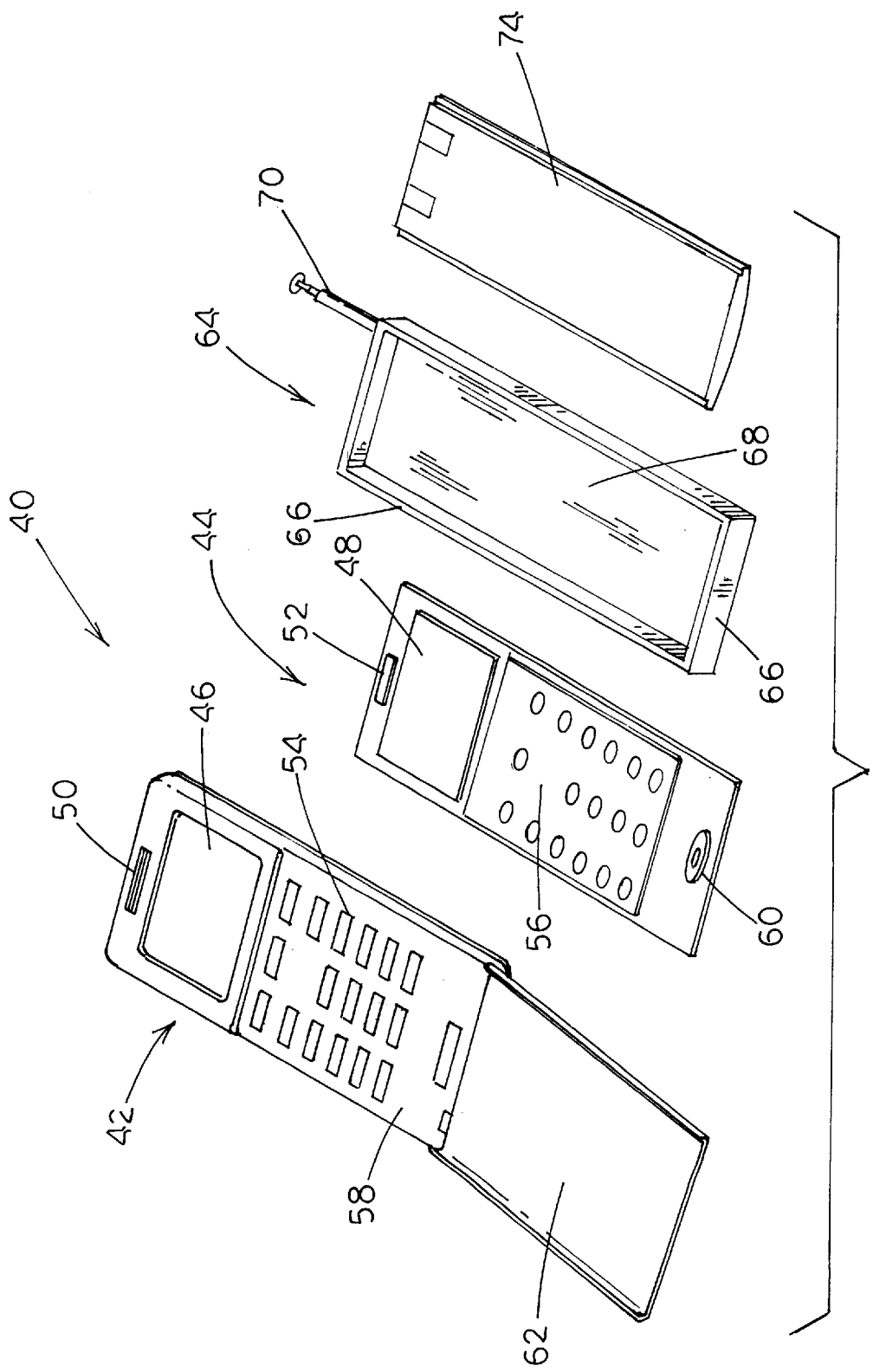
FIG. 3 is an exploded perspective view of the cellular telephone of the present invention illustrating the new frame member.
Figure 4:
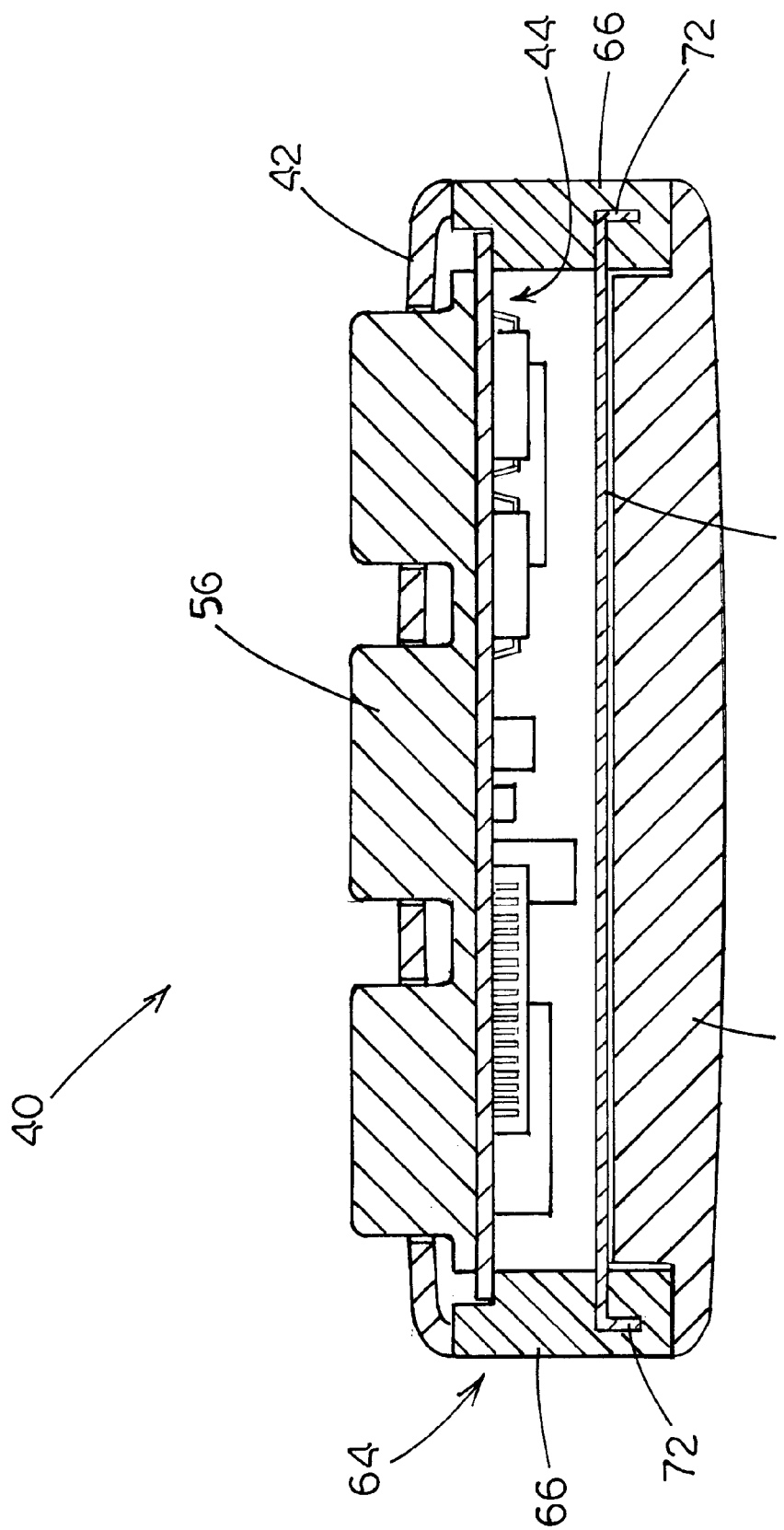
FIG. 4 is transverse sectional view of the cellular telephone of the present invention.

Illustrated in FIGS. 3 and 4 is the cellular telephone 40 of the present invention. Cellular telephone 40 generally comprises an upper enclosure or housing 42, a printed circuit board 44, a structural frame member 64 and a battery 74. Details of the cellular telephone 40 will not be dealt with herein because such is not per se material to the present invention and further, cellular telephones and their basic technology are appreciated by those skilled in the art. However, a brief review of a number of basic components of the cellular telephone 40 will be discussed below.

As specifically shown in FIG. 3, formed within the housing 42 are a number of features which generally correspond with components located on the printed circuit board 44. For example, disposed about the exterior face of the housing 42 is a display panel aperture 46, which corresponds with a display panel 48 disposed on the printed circuit card 44. Adjacent the display panel aperture 46 is an earphone or speaker aperture 50, which corresponds with a speaker component 52 on the printed circuit card 44. Also disposed on the face of the housing 42 is an array of keypad apertures 54, which corresponds with a tactile keypad component 56 mounted on the printed circuit card 44. A microphone aperture 58 is located adjacent the keypad apertures 54 and is disposed so as to correspond with a microphone component 60 also mounted on the printed circuit board 44. Disposed about the lower exterior surface of the housing 42 is a flip 62, configured so as to cover and generally protect the keypad 56 when in a closed configuration. Again, it is to be understood that the above is simply a general description of some of the basic components of one cellular telephone design and that these components can be designed and arranged in many different ways.

Forming a part of the cellular telephone 40 is a structural frame member 64, which is comprised of a surrounding side wall 66 and a web 68. Formed within the frame member 64 is an antenna receptacle 70, which communicates with the enclosed printed circuit board 44. The side wall 66 is formed through a die-casting process using a suitable material such as magnesium or zinc or alloys of each. As used herein, the term die-cast refers to a structure formed by a process whereby the casting material is melted into a liquid phase and poured into a die-cast type mold. Upon solidification the casting material assumes the general shape of the mold.

The web 68 comprises a thin, high strength formed member, such as a plate of stainless steel. Formed members are components which have been stamped, pressed, punched, rolled or otherwise fabricated while the formed material is in a generally solid phase. As shown in FIG. 4, the thin plate or web 68 contains a lip or flange 72 along its perimeter which is incorporated into the die-cast side wall 66. Incorporation of the formed steel plate member into the frame structure 64 may be achieved through a modified die-cast fabrication process, which includes an insert molding step. In this process, the formed steel plate comprising the web 68 is generally secured within the die-casting mold, while the molten material (magnesium or zinc for example) is poured in and generally around it. As the material cools, the flanges 72 of the web 68 are embedded within the solidifying side wall structure 66.

As detailed in FIG. 4, the web 68 is disposed so as to extend between the surrounding side wall 66 and divides the enclosed interior space into a printed circuit board compartment and a battery compartment or section. The printed circuit board compartment is bounded on the top by the housing 42, and on the bottom by the web 68. Contained within the printed circuit board compartment is the printed circuit board 44 and associated electrical components. The web 68 also serves as an upper boundary for the battery section, while the battery pack 74 itself is, in conventional fashion, generally adapted to attach to the frame member 64 and effectively forms the back of the cellular telephone 40. It should be pointed out that the frame member 64 in some designs could be sandwiched between front and back housing sections. In this case, the frame member 64 along with the housing sections would form compartments on each side of the web 68.

As discussed above, the structural frame design incorporated in the prior art cellular telephone unit 10 is significantly limited with regard to minimum achievable web thickness. Specifically, the structural frame member 14 utilized in the prior art cellular telephone 10 is formed as a one-piece, one-material unit from a conventional die-cast fabrication process. Thus, the side wall 16 and the web 18 of the prior art frame 14 (FIG. 2) are composed of the same material, typically magnesium or zinc or either of their alloys. The cellular telephone 40 of the present invention, on the other hand, utilizes a unique, hybrid structural frame design 64 which overcomes the limitations encountered by the prior art design.

The hybrid frame 64 of the present invention avoids the web thickness limitations encountered with the single material, die-cast fabrication process by forming the side walls 66 and the web 68 of different materials. Through careful selection of the web material, a structurally sound frame can be constructed with a web 68 which is significantly thinner than the web 18 of the prior art cellular telephone 10. For example, in one particular embodiment of the cellular telephone 40 of the present invention, the side wall 66 is composed of die-cast magnesium, while the web 68 is composed of a thin steel plate. The side wall 66 and web 68 are bonded together through an insert molded die-cast process. As seen in FIG. 4, the steel plate comprising the web 68 projects into the inner surface of the surrounding side wall 66 and is actually suspended or supported by the side wall 66. Using this combination of materials, a web thickness on the order of 0.2 millimeters is obtainable, as compared to a general minimum web thickness of 1.0 millimeters formed in typical prior art cellular telephone frame designs, such as that discussed above and shown in FIG. 2. This constitutes an effective web thickness reduction of approximately 80% over the prior art web 18. Ultimately, this dramatic frame web thickness reduction can translate to approximate a 5% reduction in overall thickness of the phone unit 40 with respect to prior art phone unit designs.

From the above discussion and associated drawings, it is evident that the cellular telephone design of the present invention is able to achieve a substantial savings in overall phone unit thickness through the implementation of the hybrid structural frame member 64, which is achieved by the side wall 66 and web 68 elements being composed of different materials. Through careful selection of the web material, a structurally sound frame 64 can be constructed having a web 68 which is significantly thinner than the web of prior art frame designs.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A cellular telephone comprising: a housing structure; a frame disposed adjacent the housing structure and including a pair of side walls and a web fixedly secured to and extending between the side walls to form a unitary structural frame and wherein the side walls and web are constructed of different materials.

2. The cellular telephone of claim 1 wherein the side walls and web are formed through an insert molded die-cast process.

3. The cellular telephone of claim 1 wherein the side walls are formed of magnesium and the web comprises a sheet of steel that extends between the magnesium side walls.

4. The cellular telephone of claim 1 wherein the web is of a thickness of 0.5 millimeters or less.

5. The cellular telephone of claim 4 wherein the web is of a thickness of 0.2 millimeters or less.

6. The cellular telephone of claim 1 wherein the side walls of the frame include an inner face and wherein the web projects into and through the inner face of the side walls and effectively secures the web to the side walls.

7. A cellular telephone having a frame structure including a surrounding side wall and a web secured to the side wall and extending therebetween so as to form a unitary frame structure; wherein the side wall and web are constructed of different materials and wherein the interconnected web comprises a non-casted, formed structure.

8. The cellular telephone of claim 7 wherein the same comprises an insert molded die-cast composite including a die-casted side wall structure and the non-casted formed web structure.

9. The cellular telephone of claim 8 wherein the die-casted side wall is formed of magnesium while the non-casted formed web structure includes a sheet of steel.

10. The cellular telephone of claim 8 wherein the web structure includes a perimeter bent flange embedded within the casted side wall structure for securing the web to the side wall structure.

11. The cellular telephone of claim 7 wherein the side wall structure is formed of casted magnesium while the web comprises a non-casted formed sheet of steel.

12. A cellular telephone having a structural frame that extends through an intermediate section of a cellular telephone and including an insert die-cast composite having a die-casted outer surrounding side wall and a non-casted formed web fixedly interconnected to the surrounding side wall and spanning across the same.

13. The cellular telephone of claim 12 wherein the side wall is casted from a material taken from the group consisting of magnesium and zinc, and wherein the web is formed of a sheet of steel.

14. The cellular telephone of claim 13 wherein the casted side wall includes an inner face and wherein the sheet of steel that forms the web projects into and through the inner face of the web such that a perimeter portion of the web is embedded within the casted side wall so as to securely connect the web with the side wall.

15. The cellular telephone of claim 14 wherein the web includes a bent perimeter portion that is embedded within the casted side wall of the frame so as to securely interlock the web with the side wall of the frame.

16. The cellular telephone of claim 12 wherein the insert die-casted composite extends between a printed circuit board and an attached battery that forms a part of the cellular telephone.

17. The cellular telephone of claim 12 wherein the thickness of the web is approximately 0.2 to 0.8 millimeters.

* * * * *